United States Patent
Bauchot et al.

(10) Patent No.: US 7,796,037 B2
(45) Date of Patent: Sep. 14, 2010

(54) SYSTEM FOR FACILITATING THE HANDLING OF GOODS BASED ON CONTAINERS EQUIPPED WITH AN RFID TAG

(75) Inventors: Frederic Bauchot, Saint-Jeannet (FR); Jean-Yves Clement, Saint Jeannet (FR); Gerard Marmigère, Drap (FR); Christophe Samtmann, Nice (FR)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/677,780

(22) Filed: Feb. 22, 2007

(65) Prior Publication Data

US 2008/0001742 A1    Jan. 3, 2008

(30) Foreign Application Priority Data

Jun. 30, 2006    (EP) .................................. 06116420

(51) Int. Cl.
G08B 13/14    (2006.01)
(52) U.S. Cl. ................................. 340/568.5; 340/568.1
(58) Field of Classification Search .............. 340/568.5, 340/585.5
See application file for complete search history.

(56) References Cited

U.S. PATENT DOCUMENTS

| 4,417,630 A * | 11/1983 | Weber et al. ................... 177/1 |
|---|---|---|
| 6,382,357 B1 * | 5/2002 | Morrison et al. ............... 186/61 |
| 7,096,151 B2 * | 8/2006 | Klein ........................... 702/173 |
| 7,311,250 B1 * | 12/2007 | Herwig ......................... 235/383 |
| 2001/0017588 A1 * | 8/2001 | Symonds et al. .......... 340/568.5 |
| 2004/0252025 A1 * | 12/2004 | Silverbrook et al. ...... 340/568.5 |
| 2005/0226489 A1 * | 10/2005 | Beach et al. ................. 382/141 |

FOREIGN PATENT DOCUMENTS

| JP | 06348974 A | * | 12/1994 |
| WO | WO9120057 A1 | * | 11/1991 |
| WO | WO 9120057 A1 | * | 12/1991 |

* cited by examiner

*Primary Examiner*—Daniel Wu
*Assistant Examiner*—Naomi Small
(74) *Attorney, Agent, or Firm*—Schmeiser, Olsen & Watts; William H. Steinberg (57) ABSTRACT

Containers such as shopping carts and shopping baskets take advantage of fraud detection systems in place with RFID cash registers in stores. The weight of the container is obtained when entering the store and the weight of the shopped articles is correlated with the list of the articles detected by the RFID reader of the cash register. Recognizing a particular container in the store is done using RFID technology with an RFID tag integrated in the structure of the container. The RFID tag can also contain information such as the weight, size, color, type, form, etc. of container.

20 Claims, 5 Drawing Sheets

Figure 5

SYSTEM FOR FACILITATING THE HANDLING OF GOODS BASED ON CONTAINERS EQUIPPED WITH AN RFID TAG

CROSS-REFERENCE TO RELATED APPLICATIONS

This application claims priority from EPO Application Serial No. EP06116420 filed on Jun. 30, 2006 and entitled SYSTEM FOR FACILITATING THE HANDLING OF GOODS BASED ON SHOPPING CARTS EQUIPPED WITH A RFID TAG.

FIELD OF THE INVENTION

The present invention relates to stores and supermarkets equipped with Radio Frequency Identifier (RFID) tags and more particularly to a method and system for facilitating the handling of goods based on containers equipped with an RFID tag.

BACKGROUND OF THE INVENTION

The use of the (RFID) Radio Frequency IDentifier technology in supermarkets brings a great effectiveness regarding the checkout speed. This is possible due to the fact that it is no longer necessary to read individually each article on a conveyor. The content of the shopping cart can be identified on the fly without removing the articles that the customer put inside the cart. Nevertheless some handling remains tiresome for the customer, for example, placing the articles in the bags, depositing the bags in the trunk of the car, and carrying the bags from the car to the house.

The problem is that when a consumer goes shopping in a supermarket, he is obliged to take the articles from the shelves and put them in a shopping cart, transfer them from the shopping cart to a cash register conveyor, place them in paper or plastic bags and put the bags in the shopping cart, transport the bags to the car, and then return the empty shopping cart to the store. In fact, there is a real need to optimize and facilitate all the handling operations using the RFID technology already in place in stores or supermarkets.

SUMMARY OF THE INVENTION

Briefly stated, containers such as shopping carts and shopping baskets take advantage of fraud detection systems in place with RFID cash registers in stores. The weight of the container is obtained when entering the store and the weight of the shopped articles is correlated with the list of the articles detected by the RFID reader of the cash register. Recognizing a particular container in the store is done using RFID technology with an RFID tag integrated in the structure of the container. The RFID tag can also contain information such as the weight, size, color, type, form, etc. of container.

According to an embodiment of the invention, a method of weighing RFID tagged articles in a container without emptying the container includes the steps of: (a) identifying the container by reading a code of an RFID tag integrated in the container, wherein each container has a unique RFID code; (b) retrieving a reference weight corresponding to the empty container, wherein the reference weight is associated with the RFID code; (c) measuring a weight of the empty container to obtain a measured weight; (d) comparing the measured weight with the reference weight of the empty container; (e) authorizing an access for the container when a difference between the measured weight and the reference weight of the empty container does not exceed a predetermined threshold; and (f) recording the authorized access of the container.

According to an embodiment of the invention, a computer program product includes a computer usable medium including computer usable program code for weighing RFID tagged articles in a container without emptying the container, with the computer program product including (a) computer usable program code for identifying the container by reading a code of an RFID tag integrated in the container, wherein each container has a unique RFID code; (b) computer usable program code for retrieving a reference weight corresponding to the empty container, wherein the reference weight is associated with the RFID code; (c) computer usable program code for measuring a weight of the empty container to obtain a measured weight; (d) computer usable program code for comparing the measured weight with the reference weight of the empty container; (e) computer usable program code for authorizing an access for the container when a difference between the measured weight and the reference weight of the empty container does not exceed a predetermined threshold; and (f) computer usable program code for recording the authorized access of the container.

According to an embodiment of the invention, a system for weighing RFID tagged articles in a container without emptying the container includes means for identifying the container by reading a code of an RFID tag integrated in the container, wherein each container has a unique RFID code; means for retrieving a reference weight corresponding to the empty container, wherein the reference weight is associated with the RFID code; means for measuring a weight of the empty container to obtain a measured weight; means for comparing the measured weight with the reference weight of the empty container; means for authorizing an access for the container when a difference between the measured weight and the reference weight of the empty container does not exceed a predetermined threshold; and means for recording the authorized access of the container.

DETAILED DESCRIPTION OF THE PREFERRED EMBODIMENT

The present invention proposes a way to handle goods in supermarkets equipped with RFID technology. The main object of this invention is to limit the amount of time the customer will have to handle the goods he/she buys. According to an embodiment of the present invention, supermarket customers will have to handle the goods they buy only twice, once to take the goods from the shelves and put them into the shopping cart, and again to take the goods from the shopping cart and put them into the fridge, assuming that the bags or containers are not directly stackable in the fridge.

The proposed solution for limiting the handling of goods is based on the commercialization of personal RFID containers such as a shopping cart, a basket, a bag, a suitcase, a box, rolling boxes, and rolling suitcases, preferably with retractable wheels to fit into the trunk of a car, or any kind of container easy to bring home which includes an integrated RFID tag. According to the present invention, each customer has his own container such as a shopping cart or basket in order to limit the handling of goods. Customers have the option of bringing their personal shopping carts or baskets home and putting them directly in the refrigerator or cupboard. The idea is to make the container a personal object belonging to the customer. It is also possible to have specialized containers for predetermined contents, such as meats, vegetables, frozen goods, and so forth which can be placed directly in the refrigerator.

In order for the personal shopping baskets or shopping carts to be compatible with the fraud detection systems already in place in RFID cash registers, it is necessary for these cash registers to know their exact weight. At present in many stores, shopping carts are weighed with their contents to prevent customers from removing or masking RFID labels. This operation assumes that all shopping carts of a same store are identical and have the same weight. After subtracting the weight of the shopping cart from the total weight, the weight of the contents is correlated with the list of articles detected by the RFID reader of the cash register. In the context of the present invention, where personal baskets and personal shopping carts are not identical, it is necessary first to identify them in order to compute the exact weight of the content. To recognize the shopping cart of Mr. Smith among the thousands of shopping carts present in a store, the use of RFID technology is very simple and an efficient solution. The RFID tag can be integrated in the structure of the basket or the shopping cart in order to improve the fraud detection system. It is also possible to include, in addition to a serial number, information in the RFID tag such as the weight, size, color, type, form, etc. of the shopping cart or basket.

According to the present invention, a Radio Frequency IDentifier (RFID) tag is integrated within each basket or shopping cart. The core of any RFID system is the 'Tag' or 'Transponder', which can be attached to or embedded within objects, wherein data can be stored. An RFID reader, generically referred to simply as "reader" in the following description, sends out a radio frequency signal to the RFID tag that broadcasts its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require batteries for transmission since they are generally powered by the reader using an induction mechanism, where an electromagnetic field is emitted by the reader antenna and received by an antenna localized on the RFID tag. This power is used by the RFID tag to transmit a signal back to the reader, carrying the data stored in the RFID tag. Active RFID tags require a battery to transmit a signal to a reader. A signal is emitted at a predefined interval or transmitted only when addressed by a reader.

When a passive High Frequency (HF) RFID tag is to be read, the reader sends out a power pulse to the RFID antenna. The electro-magnetic field generated is "collected" by the antenna in the RFID tag that is tuned to the same frequency. When the power pulse ends, the RFID tag immediately transmits back its data, which is picked up by the receiving antenna and decoded by the reader.

RFID tags can be read-only, write-once, or read-write. A read-only RFID tag includes a read-only memory that is loaded during manufacturing process. Its content can not be modified.

Figure 1:
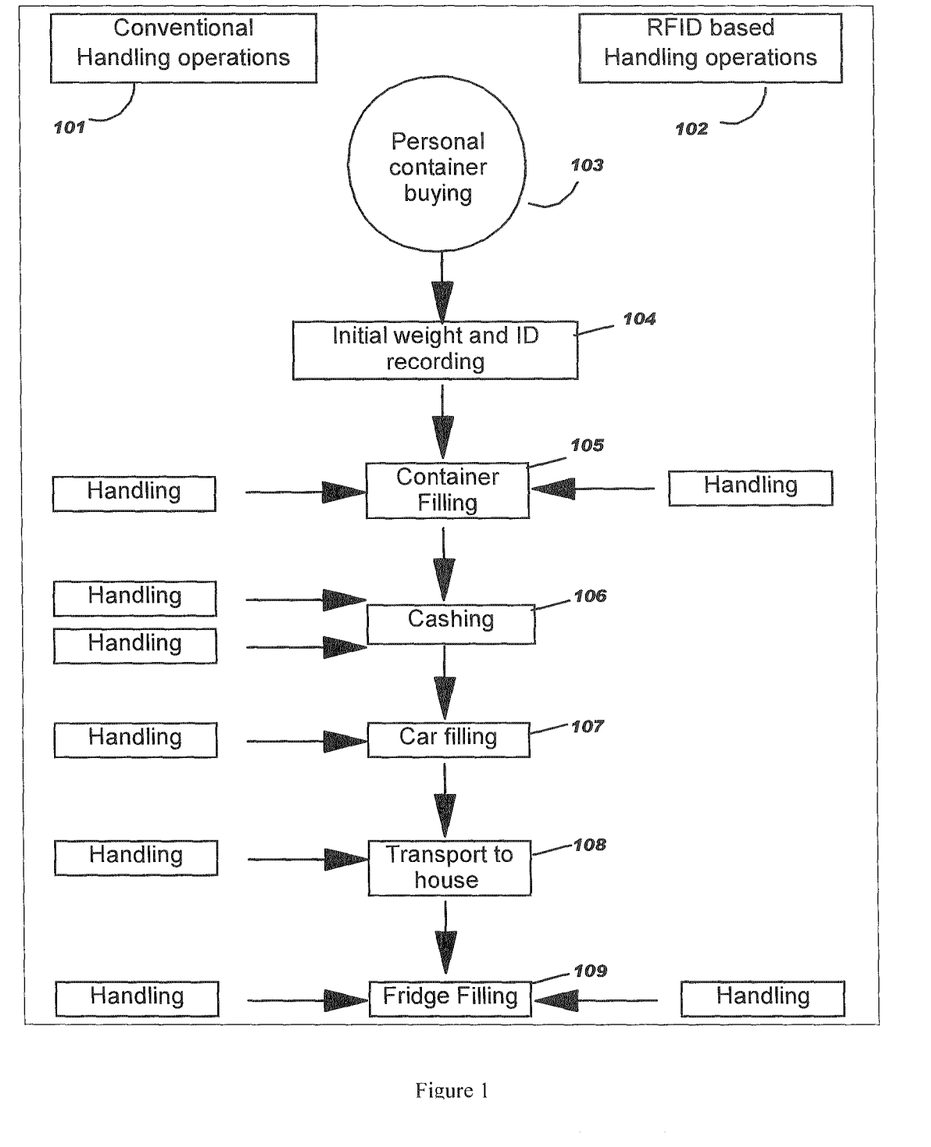
FIG. 1 compares the current way of handling goods with the way of handling goods according to the present invention.
Figure 2:
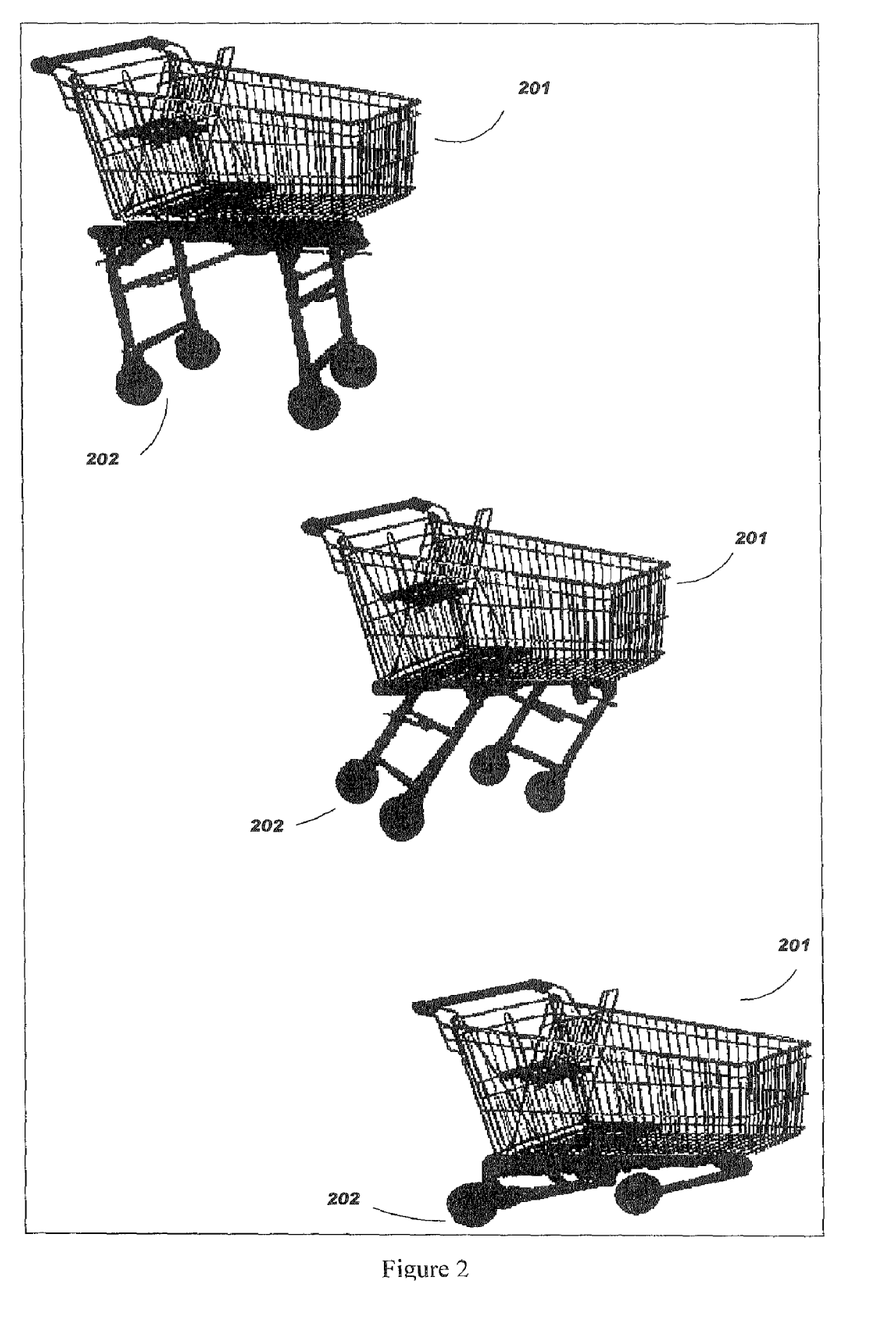
FIG. 2 shows a shopping cart with retractable wheels.
Figure 3:
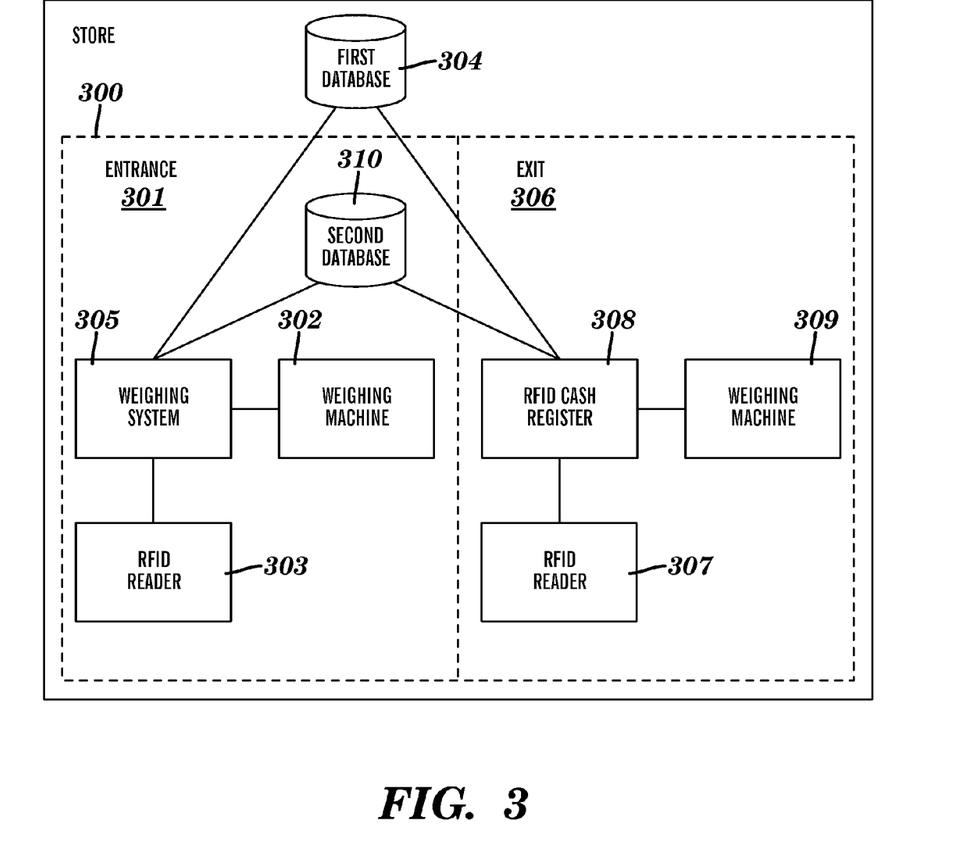
FIG. 3 is a general view of the system according to the present invention.

Referring to FIGS. 1-3, a customer arrives with his/her car in the parking lot of the supermarket, takes out the basket and fixes it on a rolling support with a flat top. In one embodiment, the rolling support is provided by the store. In another embodiment, a basket or container 201 has its own system of retractable wheels 202 as shown in FIG. 2. The customer comes into the store and puts his/her shopping cart on an RFID weighing machine 302. Instantaneously an RFID weighing system 305 checks that the measured weight is in accordance with the shopping cart model and optionally recognizes its form.

Figure 4:
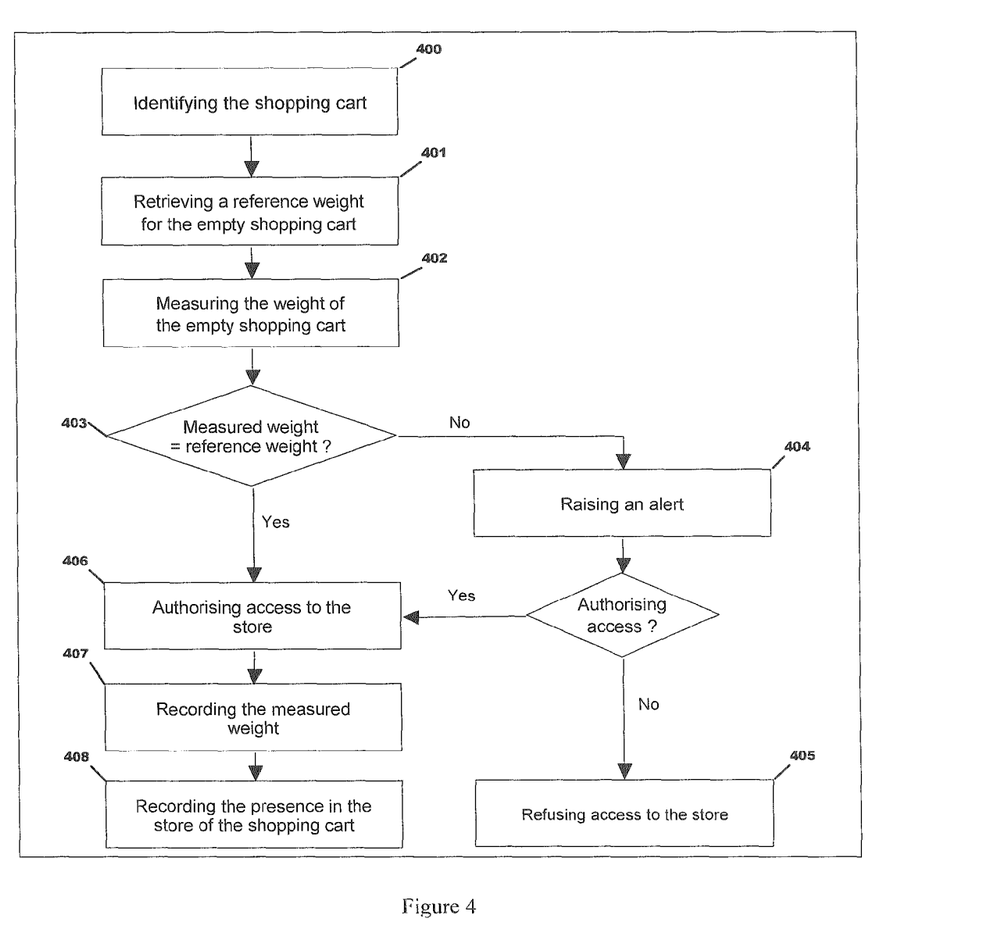
FIG. 4 is a flow chart of the method of measuring and checking the weight of an empty shopping cart at a store entrance according to the present invention.

As shown in FIG. 4, the method of measuring and checking the weight of the empty shopping cart at an entrance 301 of a store 300 includes a step 400 of identifying the shopping cart 201 of the customer by an RFID reader 303 which recognizes the code of the RFID tag integrated in the shopping cart, with each shopping cart having a unique RFID code. In a preferred embodiment, the RFID tag is a passive read only RFID tag that cannot be modified by the customer.

In step 401, a reference weight of the empty shopping cart original weight of the shopping cart specified and/or certified by the manufacturer is retrieved. In a preferred embodiment, the reference weight is written in the RFID tag integrated in the shopping cart so it cannot be modified by the customer and is retrieved by means of the RFID reader 303. In another embodiment, the reference weight is stored with the RFID code in a first local or remote data base 304 and is retrieved from this first data base 304.

In step 402, the weight of the empty shopping cart is measured by an electronic weighing machine 302. In step 403, the measured weight is compared with the reference weight of the empty shopping cart. If the measured weight and the reference weight of the empty shopping cart are significantly different, a weight margin can be defined by the manufacturer of the shopping cart or by the store and in step 404, raising an alert and recording the anomaly, in step 405, refusing access of the shopping cart in the store 300; or in step 406, authorizing the access of the shopping cart in the store. In this last case, the process includes the further steps of step 407, recording the measured weight and step 408, recording the presence in the store of the shopping cart.

If the measured weight and the reference weight of the empty shopping cart are not significantly different, then in step 406, access of the shopping cart into the store is authorized, in step 407, the measured weight is recorded in a second data base 310 preferably accessible by one or a plurality of cashing registers at the exit of the store, and in step 408, recording the presence in the store of the shopping cart in the second data base 310.

Let us consider a customer intending to cheat. This customer arrives at the entrance of the store and artificially increases the weight of his/her shopping cart with metal masses or bags of water that he will empty in the store, or a purse that will be hand-carried out of the store. The weighing system at the entrance of the store measures the weight of the shopping cart and compares the measured weight with the manufacturer specifications. The manufacturer specifications may be stored in a local or remote data base. In an particular embodiment the weighing system checks the manufacturer specifications in a centralized database shared by a plurality of stores or manufacturers. In the present case, since the measured weight is different from the specified weight, the weighing system immediately detects an anomaly and triggers an alert.

The customer can also be identified by means of the personal shopping cart. In this case, depending on the consumer profile and the RFID tag integrated in the shopping cart, personalized shopping guidance can be activated based on the detection and localization of the shopping cart in the store.

After having filled the shopping cart, the customer goes to a cash register 308 where all the tagged articles are automatically read in the shopping cart without having to handle them. At the same time, the shopping cart RFID tag is read by means of an RFID reader 307 in order to obtain its reference weight or the weight that was measured at the store entrance. The weight of the empty shopping cart is subtracted from the total weight of the full shopping cart measured at the cash register 308 by a weighing machine 309. The resulting weight is correlated with the sum of the theoretical weight of each tagged article detected in the shopping cart. If an article is not detected for any reason, for instance a voluntary or accidental screening of the tag, the measured weight of the content will exceed the computed theoretical weight corresponding to the invoice. With this system any error can be easily detected and corrected.

Figure 5:
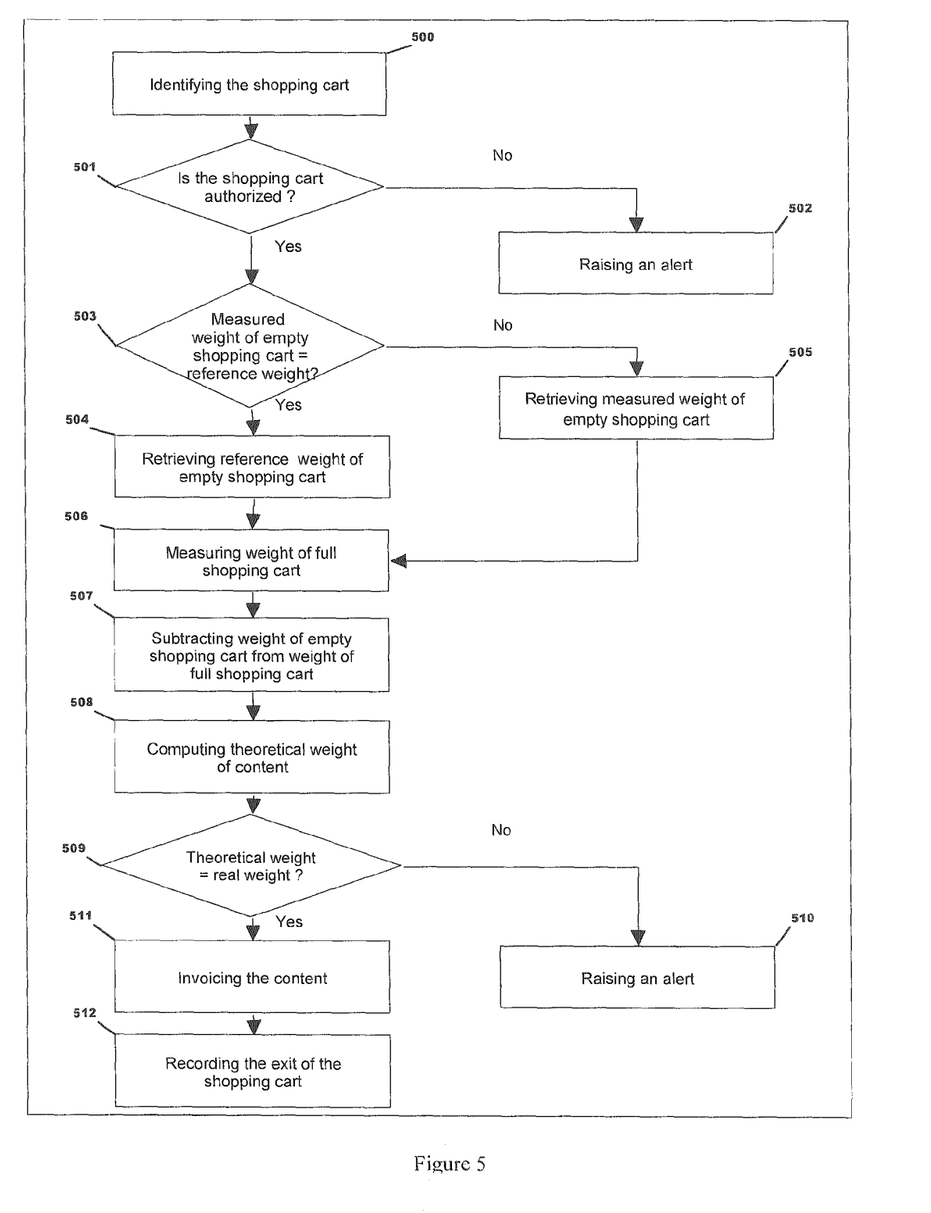
FIG. 5 is a flow chart of the method of measuring and checking the weight of tagged articles in a shopping cart at a cash register according to the present invention.

Since the customer can be identified by means of his shopping cart or basket, all the types of personalized invoicing systems are possible. As shown in FIG. 5, the method of weighing the full shopping cart at an exit 306 of the store 300 includes step 500 of identifying the shopping cart of the customer by reading, using the RFID reader 306, the code of the RFID tag integrated in the shopping cart, when each shopping cart has a unique RFID code. In step 501, the system determines whether or not the shopping cart has been authorized at the entrance of the store. More particularly, this step includes the step of checking whether or not an anomaly has been detected and recorded in the second data base 310 during the weighing of the empty shopping cart at the entrance of the store. If the shopping cart has been authorized at the entrance of the store, the process continues. If the shopping cart has not been authorized at the entrance of the store, an alert is raised in step 502.

In step 503, the system determines from the second data base 310 whether or not the weight of the empty shopping cart previously measured corresponds to the reference weight. If the weight of the empty shopping cart as previously measured corresponds to the reference weight, the reference weight of the empty shopping cart is retrieved in step 504. In a preferred embodiment, the reference weight is written in the RFID tag of the shopping cart and is retrieved by means of the RFID reader 307. In another embodiment, the reference weight is associated with the RFID code in the first local or remote data base 304 and is retrieved from this first data base 304.

If the weight of the empty shopping cart previously measured does not correspond to the reference weight, in step 505 the weight of the empty shopping cart previously measured and recorded at the entrance of the store is retrieved from the second data base 310; this measured weight being associated with the RFID code in the second data base 310. In step 506, the weight of the full shopping cart is measured by an electronic weighing machine 309. In step 507, the real weight of the content is determined by subtracting the retrieved weight of the empty shopping cart from the total weight of the full shopping cart measured at the cash register 308.

In step 508, a theoretical weight for the content is computed by summing the theoretical weight of each article detected in the shopping cart, because each tagged article in the store is associated with a theoretical weight. In step 509 the theoretical weight is compared with the real weight of the content. If the theoretical weight and the real weight are significantly different a weight margin can be defined, and in step 510, an alert is raised and an anomaly recorded if the weight margin exceeds a predetermined threshold. If the theoretical weight and the real weight are not significantly different, in step 511 the content is invoiced. In step 512, the exit of the shopping cart is recorded in the second data base 310.

FIG. 1 shows the advantages of the present invention for the customer. In the left side of FIG. 1 are listed the handling operations 101 that are required in the current environment. In right side of FIG. 1 are listed the handling operations 102 that are required in an environment as described in the present invention. It is clear that the number of handling operation is significantly reduced thanks to the present invention.

As illustrated in FIG. 1, the present invention is based on the following steps. In step 103, the customer has to buy or rent a personal container shopping cart, basket, bag, or other container. In step 104, the container must include an RFID with a unique code which must be registered so that the container can be identified. The reference weight of the empty container must also be registered jointly with the RFID code.

When the customer goes shopping with his container, in step 105, the customer fills his container with tagged articles. This operation is not affected by the present invention. In step 106, at the cash register, articles do not need to be put on the conveyor and then in bags, but can remain in the original shopping container. In step 107, the whole container can be placed in the trunk of the car without handling the articles. In step 108, once the customer arrives at home, the container is transported from the car to the house with all the articles inside. In step 109, articles are placed in the refrigerator or in the cupboard. It is also possible to place the whole container with the articles inside in the refrigerator or cupboard.

The main advantage of the present invention for the store is to make different kinds of containers compatible with their RFID fraud detection system already in place and, in particular, to enable customers to use their own container, shopping cart, basket, bag, etc.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method of weighing RFID tagged articles in a container without emptying the container, the method comprising the steps of:
   identifying the container by reading a code of an RFID tag integrated in the empty container, wherein each empty container has a unique RFID code, wherein each said RFID tag comprises a customer profile identifying a different customer of a store;
   identifying a first customer associated with the empty container by reading said code of said RFID tag integrated in the empty container;

retrieving a reference weight corresponding to the empty container, wherein the reference weight is associated with the RFID code;

measuring a weight of the empty container to obtain a measured weight;

comparing the measured weight with the reference weight of the empty container;

determining, by a computer in response to said comparing, that said measured weight differs from said reference weight;

authorizing an access into said store for the empty container when a difference between the measured weight and the reference weight of the empty container does not exceed a predetermined threshold;

recording the authorized access of the container, wherein the container is filled with content comprising a plurality of items;

measuring and checking a weight of said plurality of items such that a measured weight of said plurality of items is generated;

computing a theoretical weight of said plurality of items, wherein said computing comprises summing a theoretical weight of each item of said plurality of items;

comparing the measured weight of said plurality of items with said theoretical weight of said plurality of items;

determining, in response to said comparing the measured weight of said plurality of items, a weight difference value between said measured weight of said plurality of items and said theoretical weight of said plurality of items;

determining that said weight difference exceeds a predetermined difference value; and generating an alert indicating that said weight difference exceeds said predetermined difference value.

2. The method according to the claim 1, wherein the step of comparing is performed at an entrance of a store in order to authorize or refuse access to the store.

3. The method according to claim 1, wherein the step of retrieving further comprises the step of obtaining the reference weight from the RFID tag.

4. The method according to claim 1, wherein the step of retrieving further comprises the step of retrieving the reference weight from a first data base.

5. The method according to claim 1, further comprising the step of raising an alert and recording an anomaly when the difference between the measured weight and the reference weight of the empty container exceeds the predetermined threshold; and performing one of the following steps:

(a) refusing access of the container to the store;

(b) authorizing access of the container to the store, recording the measured weight; and recording the authorization of the container to have access to the store.

6. The method according to claim 5, further comprising the steps of recording, in a second database, the measured weight, anomaly, and authorized access, which providing a shared access between the second database and at least one cash register.

7. The method according to claim 1 wherein the RFID tag of the container is a passive RFID tag whose code cannot be modified.

8. The method according to the claim 1, further comprising the step of measuring and checking a weight of at least one tagged article in the container.

9. The method according to claim 8, wherein the step of measuring and checking is performed at a cash register.

10. The method according to claim 8, further comprising the step of invoicing the at least one tagged article in the container.

11. A computer program product comprising a computer usable medium including computer usable program code for weighing RFID tagged articles in a container without emptying the container, the computer program product including:

(a) computer usable program code for identifying the container by reading a code of an RFID tag integrated in the empty container, wherein each empty, container has a unique RFID code, wherein each said RFID tag comprises a customer profile identifying a different customer of a store;

(b) computer usable program code for identifying a first customer associated with the empty container by reading said code of said RFID tag integrated in the empty container;

(c) computer usable program code for retrieving a reference weight corresponding to the empty container, wherein the reference weight is associated with the RFID code;

(d) computer usable program code for measuring a weight of the empty container to obtain a measured weight;

(e) computer usable program code for comparing the measured weight with the reference weight of the empty container;

(f) computer usable program code for authorizing an access into said store for the empty container when a difference between the measured weight and the reference weight of the empty container does not exceed a predetermined threshold;

(g) computer usable program code for recording the authorized access of the container, wherein the container is filled with content comprising a plurality of items;

(h) computer usable program code for measuring and checking a weight of said plurality of items such that a measured weight of said plurality of items is generated;

(i) computer usable program code for computing a theoretical weight of said plurality of items, wherein said computing comprises summing a theoretical weight of each item of said plurality of items;

(j) computer usable program code for comparing the measured weight of said plurality of items with said theoretical weight of said plurality of items;

(k) computer usable program code for determining, in response to said comparing the measured weight of said plurality of items, a weight difference value between said measured weight of said plurality of items and said theoretical weight of said plurality of items;

(l) computer usable program code for determining that said weight difference exceeds a predetermined difference value; and (m) computer usable program code for generating an alert indicating that said weight difference exceeds said predetermined difference value.

12. The computer program product according to claim 11, wherein the computer usable program code for retrieving further comprises computer usable program code for obtaining the reference weight from the RFID tag.

13. The computer program product according to claim 11, wherein the computer usable program code for retrieving further comprises computer usable program code for retrieving the reference weight from a first data base.

14. The computer program product according to claim 11, further comprising computer usable program code for raising an alert and recording an anomaly when the difference between the measured weight and the reference weight of the empty container exceeds the predetermined threshold; and     (a) computer usable program code for refusing access of the container to the store; and     (b) computer usable program code for authorizing access of the container to the store, recording the measured weight; and recording the authorization of the container to have access to the store.

15. The computer program product according to the claim 11, further comprising computer usable program code for measuring and checking a weight of at least one tagged article in the container.

16. The computer program product according to claim 15, further comprising computer usable program code for invoicing the at least one tagged article in the container.

17. A system for weighing RFID tagged articles in a container without emptying the container, comprising:

means for identifying the empty container by reading a code of an RFID tag integrated in the empty container, wherein each container has a unique RFID code, wherein each said RFID tag comprises a customer profile identifying a different customer of a store;

means for identifying a first customer associated with the empty container by reading said code of said RFID tag integrated in the empty container;

means for retrieving a reference weight corresponding to the empty container, wherein the reference weight is associated with the RFID code;

means for measuring a weight of the empty container to obtain a measured weight;

means for comparing the measured weight with the reference weight of the empty container;

means for authorizing an access into said store for the empty container when a difference between the measured weight and the reference weight of the empty container does not exceed a predetermined threshold;

means for recording the authorized access of the container, wherein the container is filled with content comprising a plurality of items;

means for measuring and checking a weight of said plurality of items such that a measured weight of said plurality of items is generated;

means for computing a theoretical weight of said plurality of items, wherein said computing comprises summing a theoretical weight of each item of said plurality of items;

means for comparing the measured weight of said plurality of items with said theoretical weight of said plurality of items;

means for determining, in response to said comparing the measured weight of said plurality of items, a weight difference value between said measured weight of said plurality of items and said theoretical weight of said plurality of items;

means for determining that said weight difference exceeds a predetermined difference value; and     means for generating an alert indicating that said weight difference exceeds said predetermined difference value.

18. The system according to claim 17, further comprising:

means for raising an alert and recording an anomaly when the difference between the measured weight and the reference weight of the empty container exceeds the predetermined threshold;

means for refusing access of the container to the store;

means for authorizing access of the container to the store;

means for recording the measured weight; and means for recording the authorization of the container to have access to the store.

19. The system according to the claim 17, further comprising means for measuring and checking a weight of at least one tagged article in the container.

20. The method according to claim 1, wherein said RFID tag comprises stored information comprising a size, color, type, and form of said container.

\* \* \* \* \*